(12) United States Patent
Akadiri

(10) Patent No.: US 8,139,569 B2
(45) Date of Patent: Mar. 20, 2012

(54) SYSTEM AND METHOD FOR COMMUNICATION OVER AN ADAPTIVE SERVICE BUS

(75) Inventor: Ty Akadiri, Aldie, VA (US)

(73) Assignee: Time Warner Cable, Inc., New York, NY (US)

(*) Notice: Subject to any disclaimer, the term of this patent is extended or adjusted under 35 U.S.C. 154(b) by 0 days.

(21) Appl. No.: 12/576,471

(22) Filed: Oct. 9, 2009

(65) Prior Publication Data

US 2010/0030855 A1 Feb. 4, 2010

Related U.S. Application Data

(63) Continuation of application No. 11/607,584, filed on Dec. 1, 2006, now Pat. No. 7,626,982.

(51) Int. Cl.
*H04L 12/50* (2006.01)
(52) U.S. Cl. ........................................ 370/364; 370/469
(58) Field of Classification Search .................. 370/431, 370/463, 351, 357, 360, 362, 364, 365, 464, 370/465, 466, 467, 469; 710/100, 104, 107, 710/113, 305, 306, 315
See application file for complete search history.

(56) References Cited

U.S. PATENT DOCUMENTS

| | | | | |
|---|---|---|---|---|
| 7,046,680 B1* | 5/2006 | McDysan et al. | ............ | 370/396 |
| 7,626,982 B2* | 12/2009 | Akadiri | ........................ | 370/362 |
| 7,957,394 B1* | 6/2011 | Cohen et al. | ............. | 370/395.21 |
| 2002/0181476 A1* | 12/2002 | Badamo et al. | ............... | 370/401 |
| 2005/0089016 A1 | 4/2005 | Zhang et al. | | |
| 2006/0034237 A1* | 2/2006 | Patrick et al. | ................. | 370/338 |
| 2007/0226231 A1 | 9/2007 | Venkat | | |

OTHER PUBLICATIONS

Kodali, Raghu R. "What Is Service-Oriented Architecture?: An Introduction to SOA." pp. 1-9. JavaWorld.com, Jun. 13, 2005. http://www.javaworld.com/javaworld/jw-06-2005/jw-0613-soa.html.

Nash, Andrew. "What Is This ESB Thing Anyway?" pp. 1-3. ZDNet.com, Dec. 13, 2005. http://www.zdnet.com/news/what-is-this-esb-thing-anyway/146010.

* cited by examiner

*Primary Examiner* — Kwang B Yao
*Assistant Examiner* — Obaidul Huq
(74) *Attorney, Agent, or Firm* — The Marbury Law Group, PLLC

(57) ABSTRACT

An adaptive service bus comprising adaptable logical components for transporting communications. A configuration of each logical component of the adaptive service bus is determined by receipt of a control message that establishes the behavior of that component. Thereafter, communications that are received by the adaptive service bus are processed in accordance with "rules" established by the configurations. The configuration of the adaptive service bus may be changed in real time to accommodate changes in communication types and/or changes in the processing rule for a particular communication type.

23 Claims, 8 Drawing Sheets

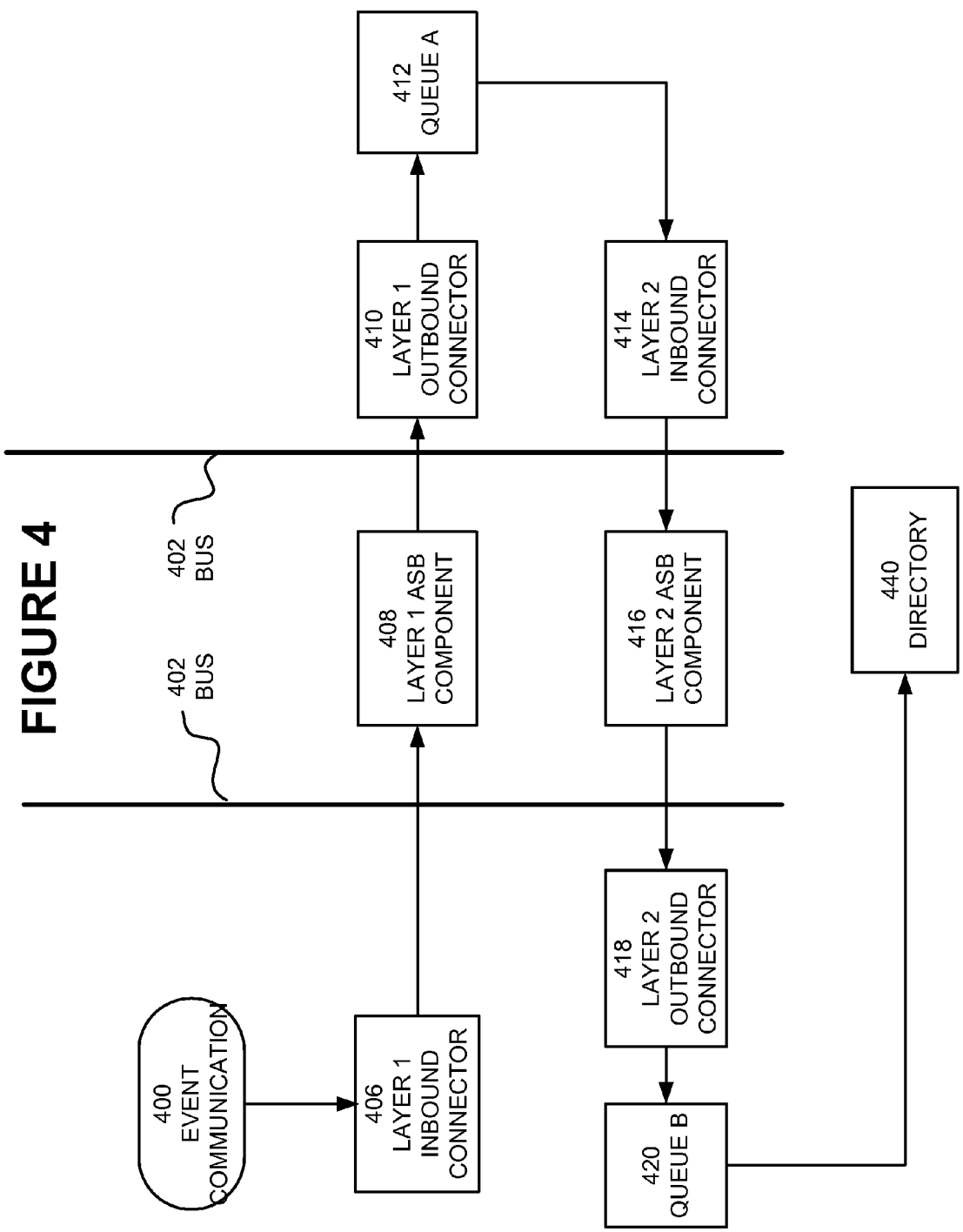

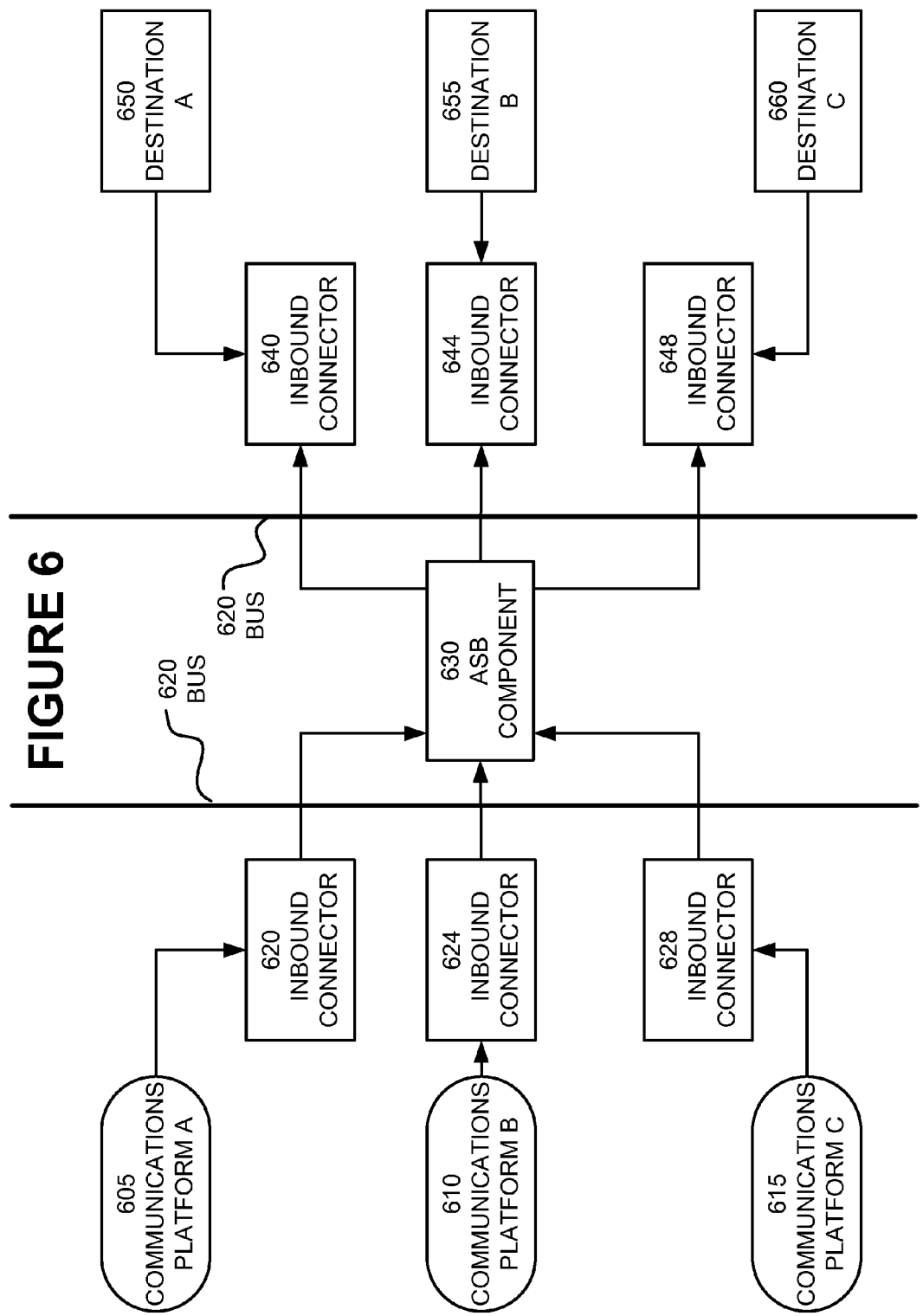

SYSTEM AND METHOD FOR COMMUNICATION OVER AN ADAPTIVE SERVICE BUS

RELATIONSHIP TO OTHER APPLICATIONS

This application is a continuation of U.S. application Ser. No. 11/607,584 filed Dec. 1, 2006 now U.S. Pat. No. 7,626,982. The Ser. No. 11/607,584 application is incorporated herein by reference in its entirety for all purposes.

BACKGROUND

Communication and data-exchange between information systems within today's enterprises is increasingly based on a method known as an "Enterprise Service Bus" or an "ESB." Conceptually, an ESB is an information processing system that serves as a central junction for receiving, routing, processing and forwarding information—in the form of formatted messages—between distributed enterprise systems. The standard method commonly consists of assembling components that receive, process and forward messages either via asynchronous constructs such as queues, or via synchronous constructs such as remote procedure calls.

Deficiencies in the standard method of creating and implementing an ESB manifest as a static rigidity in the configuration of components with respect to message pathways, and in the behavior of components with respect to the handling of messages. A limited amount of flexibility can be provided in message routing by inserting "return address/deliver to" destination information inside the messages. However, even with this technique, the actual message pathways are either static or temporary, and the messaging transport mechanisms (asynchronous, synchronous, Java Message Service, SOAP etc.) used by Enterprise Service Bus components are predetermined and static.

While ESBs are touted as solving the interoperability problems among diverse network components, the static nature of these pathways and configurations in the current implementations of ESBs has resulted in the adoption of proprietary schemes for message transport and message handling. ESB products of different vendors may thus require mediation interfaces that translate one message handling scheme to another. These mediation interfaces are inherently customized and further add to the static nature of the ESB. To the extent that a network service is not adapted to communicate with the ESB, that network service is unavailable to the ESB and its users.

What would be useful is an implementation of an ESB that is adaptable in "real-time." An "adaptable service bus" would be configurable in real-time to provide message transport and message handling for messages originating from a communication platform independent of the vendor of the communication platform and the communications protocol used by that platform.

SUMMARY

In an embodiment, an adaptive service bus (ASB) comprises an ASB component, an inbound connector, an inbound channel, an outbound connector, an outbound channel, and control channel. Each of these components is configurable in real-time using a control message allowing the ASB operator to change the message-handling components, to change the message pathways, to change the message transport protocols, to change the message formats, and to change the message processing in real-time.

An embodiment provides a method for communicating over an adaptive service bus. A control message is received. The adaptive service bus (ASB) is configured to receive and process communications according to a communication receiving rule, a communication processing rule and a communication routing rule in real-time in accordance with the control message. A communication is sent via a path to the ASB. The communication is routed within the ASB in accordance with the communication receiving rule to a message processor. The communication is processed in accordance with a communication processing rule at the message processor. The processed communication is routed in accordance with the communication routing rule.

In another embodiment, a communication receiving rule comprises at least one of a communication protocol, a subject of the communication, a content of the communication, a source of the communication, a destination of the communication, and a priority of a communication. By way of illustration and not as a limitation, the communication protocol may be a protocol used for email transport, a protocol used for hypertext transfer, a protocol used for transport of data from a database, and a protocol used for transport of data between queues.

In yet another embodiment, processing the communication in accordance with the communication processing rule comprises translating the communication to a format suitable for processing and processing the translated communication in accordance with the communication processing rule.

In still another embodiment, routing the processed communication in accordance with the communication routing rule comprises identifying an outbound channel comprising a path to the bus, obtaining a destination address for the processed communication, and placing the processed communication on the identified outbound channel for delivery to the destination address. Optionally, prior to placing the processed communication on the selected outbound channel for delivery to the destination address, a current format of the processed communication is identified. A format suitable for delivery to the destination address is identified, and the processed communication is translated to the format suitable for delivery to the destination address.

In an embodiment, the adaptive service bus is a component of a service-related enterprise and the communication is selected from the group consisting of an add-subscriber message, a delete-subscriber message, a suspend-subscriber message, an add-service message, a delete-service message, an add-device message, and a delete-device message.

An embodiment provides a method for communicating over an adaptive service bus. A control message is received from a configuration manager that is adapted for communicating the control message over a bus. By way of illustration and not as a limitation, the control message comprises an inbound connector rule, an inbound channel rule, a message processor receiving rule, a message communication processing rule, and a communication routing rule.

An inbound connector is configured in accordance with the inbound connector rule to receive a class of communications from a sending communications platform and to pass a communication within the communications class to an inbound channel. By way of illustration and not as a limitation, the class of communications comprises communications formed in accordance with a communication protocol. For example, without limitation, a communication protocol may be a protocol used for email transport, a protocol used for hypertext transfer, a protocol used for transport of data from a database, and a protocol used for transport of data between queues.

The inbound channel is configured in accordance with the inbound channel rule to receive the communication from the inbound connector and to pass the communication to a channel manager.

The channel manager is configured in accordance with the message processor receiving rule to receive the communication from the inbound channel and to pass the communication to a message processor.

The message processor is configured in accordance with the message communication processing rule to receive the communication from the channel manager, to process the communication in accordance with the communication processing rule, and to pass the processed communication to a router. Optionally, processing the communication in accordance with the communication processing rule comprises translating the communication to a format suitable for processing the selected communication and processing the translated communication in accordance with the communication processing rule.

The router is configured in accordance with the communication routing rule to receive the processed communication from the message processor, to identify an outbound channel comprising a path to the bus, to obtain a destination address for the processed communication, and to place the processed communication on the identified outbound channel for delivery to the destination address. Optionally, prior to placing the processed communication on the selected outbound channel for delivery to the destination address, a current format of the processed communication is identified, a format suitable for delivery to the destination address is identified, and the processed communication is translated to the format suitable for delivery to the destination address.

In yet another embodiment, the control message further comprises an outbound connector rule and an outbound connector is configured in accordance with the outbound connector rule. The processed communication is transported via the outbound channel and passed to a receiving communications platform at the destination address.

In an embodiment, an adaptive service bus comprises a bus, a configuration manager connected to the bus, an inbound connector connected to the bus, an inbound channel, a channel manager, a message processor, a router and an outbound channel.

The configuration manager communicates a control message over the adaptive service bus. In an embodiment, the control message comprises an inbound connector rule, an inbound channel rule, a message processor receiving rule, a message communication processing rule, and a communication routing rule.

The inbound connector is configured using the inbound connector rule to receive a class of communications from a communications platform and to pass a communication within the communications class to the inbound channel. By way of illustration and not as a limitation, the class of communications comprises communications formed in accordance with a communication protocol. For example, not as a limitation, a communication protocol may be a protocol used for email transport, a protocol used for hypertext transfer, a protocol used for transport of data from a database, and a protocol used for transport of data between queues.

The inbound channel is configured using the inbound channel rule to receive the communication from the inbound connector and to pass the communication to the channel manager. The channel manager is configured using the message processor receiving rule to receive the communication from the inbound channel and pass the communication to the message processor.

The message processor is configured using the message communication process rule to receive the communication from the channel manager, to process the communication in accordance with the communication processing rule, and to pass the processed communication to the router. Optionally, prior to processing the communication in accordance with the communication processing rule, the message processor is configured to translate the communication to a format suitable for processing the selected communication and to process the translated communication in accordance with the communication processing rule.

The router is configured using the communication routing rule to receive the processed communication from the message processor, to identify an outbound channel comprising a path to the bus, to obtain a destination address for the processed communication, and to place the processed communication on the selected outbound channel for delivery to the destination address. Optionally, prior to placing the processed communication on the selected outbound channel for delivery to the destination address, a current format of the processed communication is identified, a format suitable for delivery to the destination address is identified, and the processed communication is translated to the format suitable for delivery to the destination address.

In yet another embodiment, the adaptive service bus further comprises an outbound connector. The control message further comprises an outbound connector rule The outbound connector is configured in accordance with the outbound connector rule to receive the processed communication via the outbound channel and to pass the processed communication to a receiving communications platform at the destination address.

An embodiment provides a method for managing customer transactions in a service-related enterprise using an adaptive service bus. A transaction flow for a customer transaction is established. A control message comprising an inbound connector rule, an inbound channel rule, a message processor receiving rule, a message communication processing rule, and a communication routing rule is sent to the adaptive service bus to implement the transaction flow. The customer transaction is transported over the adaptive service bus in accordance with the inbound connector rule, the inbound channel rule, the message processor receiving rule, the message communication processing rule, and the communication routing rule to a directory identified in the transaction flow. By way of illustration and not as a limitation, the customer transaction may be an add-subscriber message, a delete-subscriber message, a suspend-subscriber message, an add-service message, a delete-service message, an add-device message, and a delete-device message.

In another embodiment, the transaction flow comprises the directory and dependent directories. The customer transaction is transported over the adaptive service bus in accordance with the inbound connector rule, the inbound channel rule, the message processor receiving rule, the message communication processing rule, and the communication routing rule to the dependent directories.

DESCRIPTION OF THE DRAWINGS

FIG. 4 illustrates an embodiment in which an ASB is used to update a directory following an "event."

FIG. 6 illustrates an embodiment in which an ASB is used to provide an adaptive security communications system according to an embodiment.

DETAILED DESCRIPTION

Figure 1:
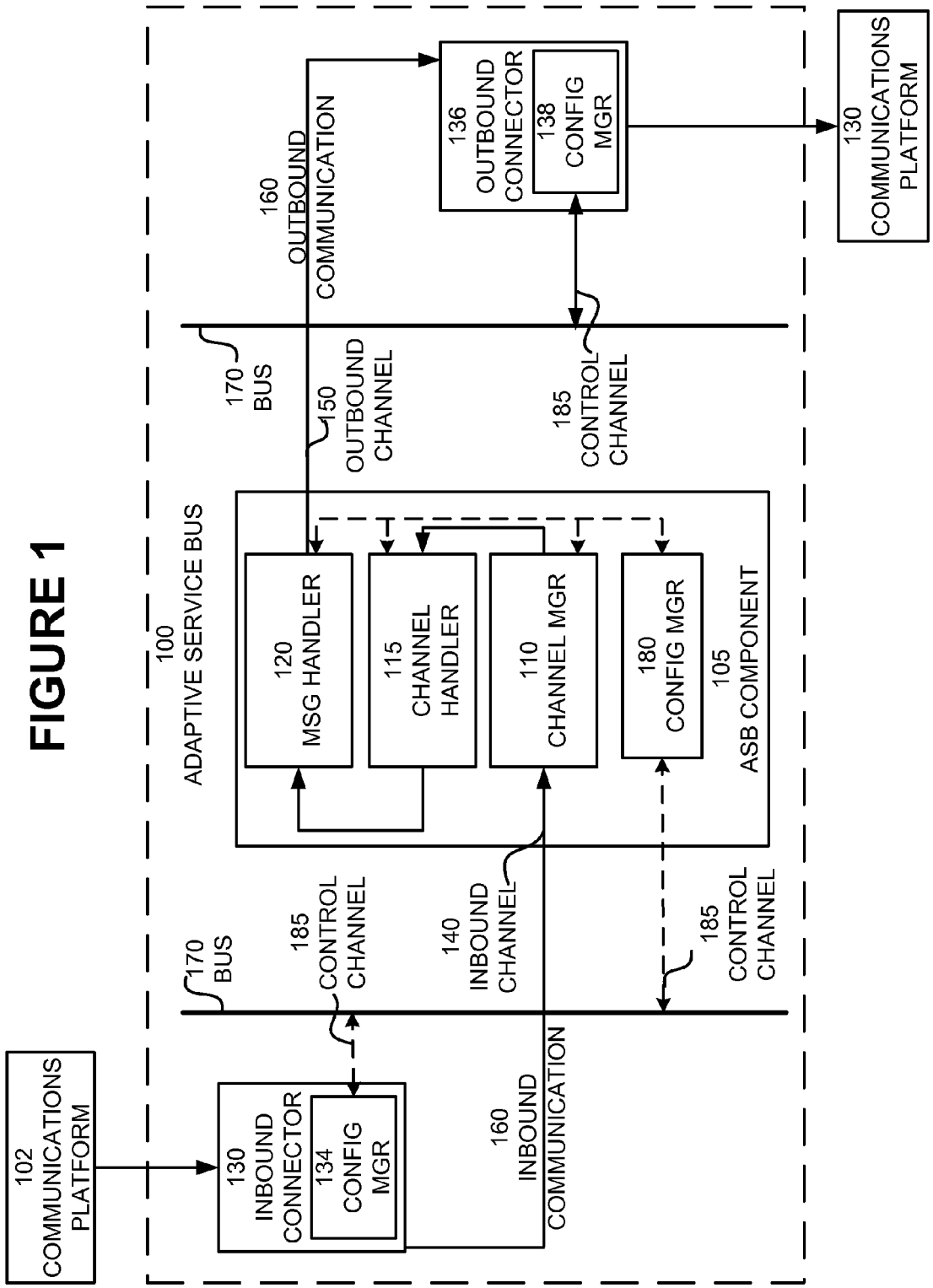
FIG. 1 illustrates a block diagram of an embodiment illustrating logical elements of an adaptive service bus.

FIG. 1 illustrates a block diagram of an embodiment illustrating logical elements of an adaptive service bus (ASB) 100. In this embodiment, the ASB 100 comprises logical elements illustrated as ASB component 105, inbound connector 130, inbound channel 140, outbound connector 136, outbound channel 150, and control channel 185.

ASB component 105 comprises a channel manager 110, a channel handler 115, a message handler 120, and a configuration manager 180. ASB component 105 is connected to inbound connector 130 via inbound channel 140 and to outbound connector 136 via outbound channel 150. The inbound connector 130 comprises a configuration manager 134. The outbound connector 136 comprises a configuration manager 138.

ASB component 105, inbound connector 130 and outbound connector 136 are also connected to bus 170 via control channel 185. Control channel 185 carries configuration information in the form of files, messages, or a specialized sequence of characters or bytes. In an embodiment, the configuration information is presented as in a text file format, such as XML, HTML, or other format known in the art. However, this is not meant to be limiting. By way of illustration and not as a limitation, configuration information may be sent in any interpretable format, such as binary formats and structured query language format. The configuration information determines the behavior of the channel manager 110, the channel handler 115, the message handler 120, the inbound connector 130 and the outbound connector 136. In an embodiment, the adaptive service bus may be reconfigured adaptively by changing the configuration of one or more of the logical components in "real time."

Inbound connecter 130 and outbound connector 136 serve as logical links (inbound or outbound) between the ASB 100 and communications platform 102 and communications platform 195, respectively. In an embodiment, the connector is implemented as a wrapper around the mechanics of a standard communications protocol operated by a communications platform. The wrapper allows the connector to accept communications from a particular protocol and to move those communications on to the ASB 100 via an appropriate channel. By way of illustration and not as a limitation, a connector may be implemented to receive communications in protocols established for email, http, relational databases, and queue-based systems. From the viewpoint of the ASB 100, all connectors are equal. This means that a database connector can be replaced with an email connector without altering the functioning of other components of the ASB 100.

Inbound channel 140, outbound channel 150 and control channel 185 comprise pathways into and out of ASB 100. A channel is an abstraction of a particular flow of a class of communications. A channel will receive communications 160 from connector 130. While only one connector 130 is illustrated in FIG. 1, the invention is not so limited. A channel may receive communications from any number of connectors in addition to connector 130. By way of illustration and not as a limitation, communications may be classified according to the subject of the communication, the content of the communication, the source of the communication, the destination of the communication, and a priority of a communication.

Because a connector configuration is adaptable, a channel may use email to receive communications at a point in time and be reconfigured in real time to receive communications from a database—without costly reprogramming, or service interruption.

Channel manager 110 functions as an "electronic clerk" that monitors (i.e. "manages") activity on at least one channel. Channel manager 110 acts as a dispatching node, handling information that may flow in through multiple channels, and controlling out-flow destined for other channels. Channel manager 110 performs its functions by delegating channel events to channel handler 115. While only one channel handler 115 is illustrated in FIG. 1, the invention is not so limited. A channel manager 110 may delegate channel events to any number of channel handlers in addition to channel handler 115. In an embodiment, this delegation function is performed by mapping a particular channel handler to a particular channel according to the configuration of channel manager 110. As previously noted, the configuration of the channel manager is adaptable so that the delegation of channel events to a particular channel handler can be changed in real time.

Channel handler 115 responds to individual events (messages) on a channel for which channel handler 115 is responsible. Each individual message is processed by a message handler, such as message handler 120. While only one message handler 120 is illustrated in FIG. 1, the invention is not so limited. A channel handler may manage any number of message handlers in addition to message handler 120. In an embodiment, the channel handler 115 performs this management function by delegating individual messages to the appropriate message handler 120. This delegation function is performed by mapping a particular message handler to a particular message according to the configuration of the channel handler. As previously noted, the configuration of the channel handler is adaptable so that the delegation of messages to a particular message handler can be changed in real time.

Figure 2:
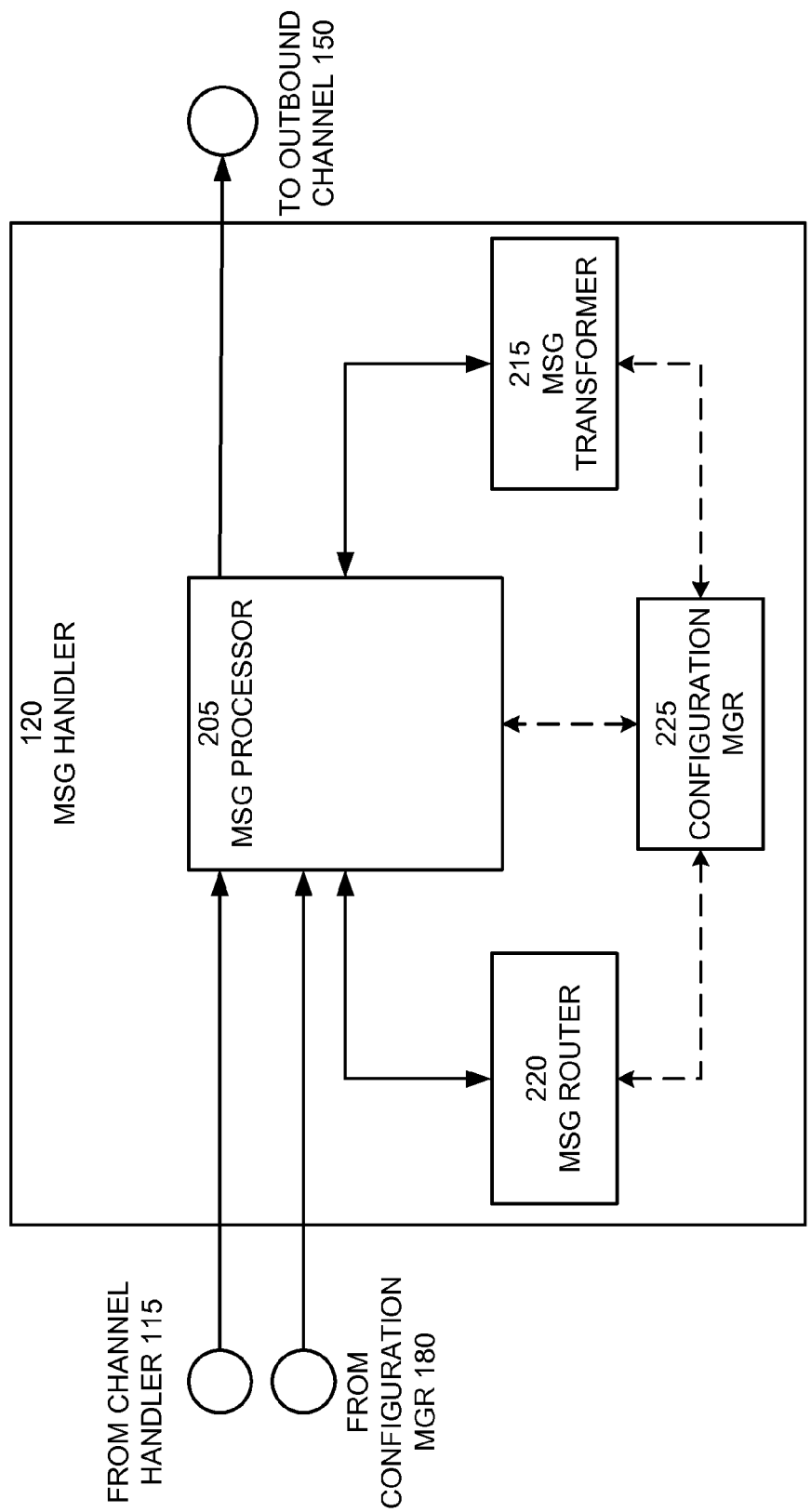
FIG. 2 illustrates a block diagram of an embodiment illustrating logical elements of a message handler component used in an adaptive service bus.

Referring to FIG. 2, the logical components of message handler 120 are illustrated according to an embodiment. Message handler 120 is responsible for the specific details of how to handle a particular message. In an embodiment, a message may comprise information that is represented in multiple formats. Optionally, before a message handler processes a message, it first translates the message into the format suitable for processing. Translation of a message from one format to another is performed by a message transformer, such as message transformer 215. While only one message transformer 215 is illustrated in FIG. 2, the invention is not so limited. A message handler 120 may manage any number of message transformers in addition to message transformer 215. In an embodiment, the message handler performs this management function by delegating individual message formats to the appropriate message transformers. This delegation function is performed by mapping a particular message transformer to a particular message format according to the configuration of the message handler. As previously noted, the configuration of the message handler is adaptable so that the delegation of message formats to a particular message transformer can be changed in real time.

Message handler 120 comprises message router 220. Message router 220 determines which destination channel a message is to be directed to after it has been processed by message handler 120. In an embodiment, the determination of the destination channel is made using the message content, the source channel, and other message properties. The operation of message router 220 is defined in a configuration document that may be updated in real-time. Thus, the flow pathways of messages in the ASB 100 can also be changed in real-time.

In an embodiment, after message handler 120 processes a message, and before the message is forwarded to its destination channel, message handler 120 invokes message transformer 215 (or other message transformer managed by message handler 120) to translate the outgoing message into a format acceptable to the destination channel.

FIGS. 1 and 2 illustrate configuration managers 134, 138, 180 and 225. The configuration managers manage the configurations of the logical components to which they are connected and allow the configuration of logical components to be changed in real time. In an embodiment, logical components that are to be made adaptable "accept" to a control channel 185. Control channel 185 is the route through which control messages flow to the components. A control message comprises a configuration document that defines the behavior of a particular logical component (the definitions sometimes referred to herein as "rules"). By sending a control message to an adaptive logical component, the adaptive logical component can be reconfigured on-the-fly. In an embodiment, all of the logical components of the ASB 100 are adaptable.

When communications platform 102 creates an inbound communication 160, the inbound communication 160 is received by inbound connector 130, which is configured to communicate with communications platform 102 and to place inbound communication 160 on bus 170. The configuration of inbound connector 130 is determined by the configuration manager 134. A communication that is received by inbound connector 130 is sent over a channel assigned to inbound connector 130 as determined by the configuration of connector 130. In this embodiment, the channel assigned to inbound connector 130 is inbound channel 140. The inbound communication is received by channel manager 110.

Based on the configuration of channel manager 110, a channel handler 115 is selected that is appropriate to the communication 160. Based on the configuration of channel handler 115, a message handler 120 appropriate to the communication 160 is selected.

Message handler 120 processes the communication 160 based on the configuration of message handler 120. FIG. 2 illustrates the logical components of message handler 120 according to an embodiment. Message handler 120 comprises message processor 205, message transformer 215, message router interface 220 and configuration manager 225. Message processor 205 uses a configuration determined by configuration manager 225 to operate on inbound communication 160. In accordance with its configuration, message processor 205 may direct inbound communication 160 to message transformer 215 to obtain transform instructions that allow it to translate inbound communication 160 into communication 160A (not illustrated) having a format suitable for processing by message processor 205. The transform instructions of message transformer 215 are established by configuration manager 225 and may be changed in "real time" by a message or a file sent over control channel 185 (FIG. 1) to configuration manager 180 (FIG. 1).

Figure 3:
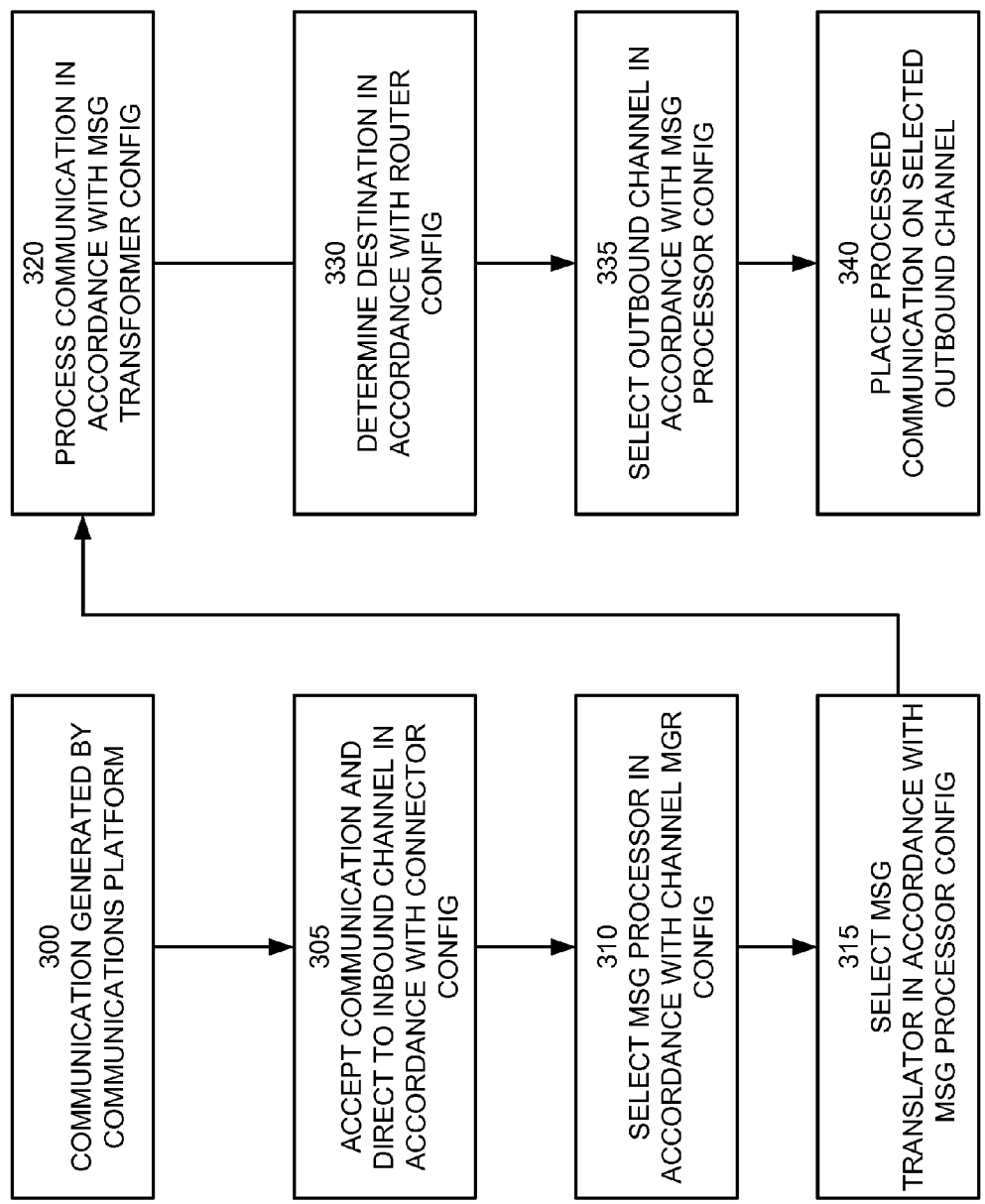
FIG. 3 illustrates a flow of a communication according to an embodiment.

Message processor 205 also communicates with message router 220. In this way, message processor 205 acquires a destination address for inbound communication 160 (or communication 160A, as appropriate). FIG. 3 illustrates a flow of a communication according to an embodiment.

A communication is generated by a communications platform 300. The communication is received by a connector configured to receive communications from the communications platform and to communicate the communication over an inbound channel in accordance with the configuration of that connector 305.

The communication is received by a channel manager, which selects a message processor to process the communication in accordance with the configuration of the channel manager 310. The message processor selects a transformer to operate on the communication in accordance with the configuration of the message processor 315. The transformer then processes the communication in accordance with the transformer configuration 320.

The destination of the processed communication is determined in accordance with the configuration of a router 330. An outbound channel is then selected in accordance with the configuration of the message processor 335. The outbound channel may be selected based on its source, its destination, its type, or other characteristics as determined by the configuration of the message processor.

The processed communication is then placed on the selected outbound channel 340 for delivery.

In an embodiment, an adaptive service bus (ASB) is used to manage subscriber transactions in a service-related enterprise. By way of illustration and not as a limitation, the service-related enterprise may be a provider of cable services, a provider of satellite services, a provider of DSL services, a provider of telephone services, a provider of Internet services, a provider of video services, or a provider of other services that manages subscriber transactions and accounts.

FIG. 4 illustrates an embodiment in which an ASB is used to update a directory following an "event." In this embodiment, a directory 440 maintains content information that is affected by changes to information within an enterprise. By way of illustration and not as a limitation, an enterprise may be a service-related enterprise in which subscribers are added, deleted, or suspended and/or in which a subscriber may be associated with various services and devices wherein the association may change. As used herein, an "event" is the occurrence of a change that affects the information held in directory 440.

As used in FIG. 4, a "layer ASB component" comprises a set of processing and routing functions that are performed on the event communication 400 before it arrives at directory 440. In an embodiment, the processing and routing functions are performed by an ASB component (see, FIG. 1, 105 and FIG. 2, 120) in accordance with a flow illustrated in FIG. 3. As illustrated in FIG. 4, event communication 400 is passed through two layer ASB components (408 and 416). However, this is not meant as a limitation. Any number of ASB components may be layered to process event communication 400 without departing from the scope hereof.

An event communication 400 is generated in response to the occurrence of an event. Layer 1 inbound connector 406 receives the event communication 400 and passes it to layer 1 ASB component 408 over bus 402 via an inbound channel (not illustrated; see FIG. 1). The event communication 400 is then processed according to the configuration setting of the layer 1 ASB component 408. The processed event communication 400 is then delivered via an outbound channel (not illustrated; see FIG. 1) to layer 1 outbound connector 410 via bus 402 to queue A 412.

The processing of event communication 400 may result in the creation of multiple messages each with its own destination. Thus, while FIG. 4 illustrates layer 1 outbound connector 410 communication with a single queue (queue A 412), layer 1 outbound connector 410 may communicate with any number of queues according to the configuration of layer 1 ASB component 408.

Figure 5A:
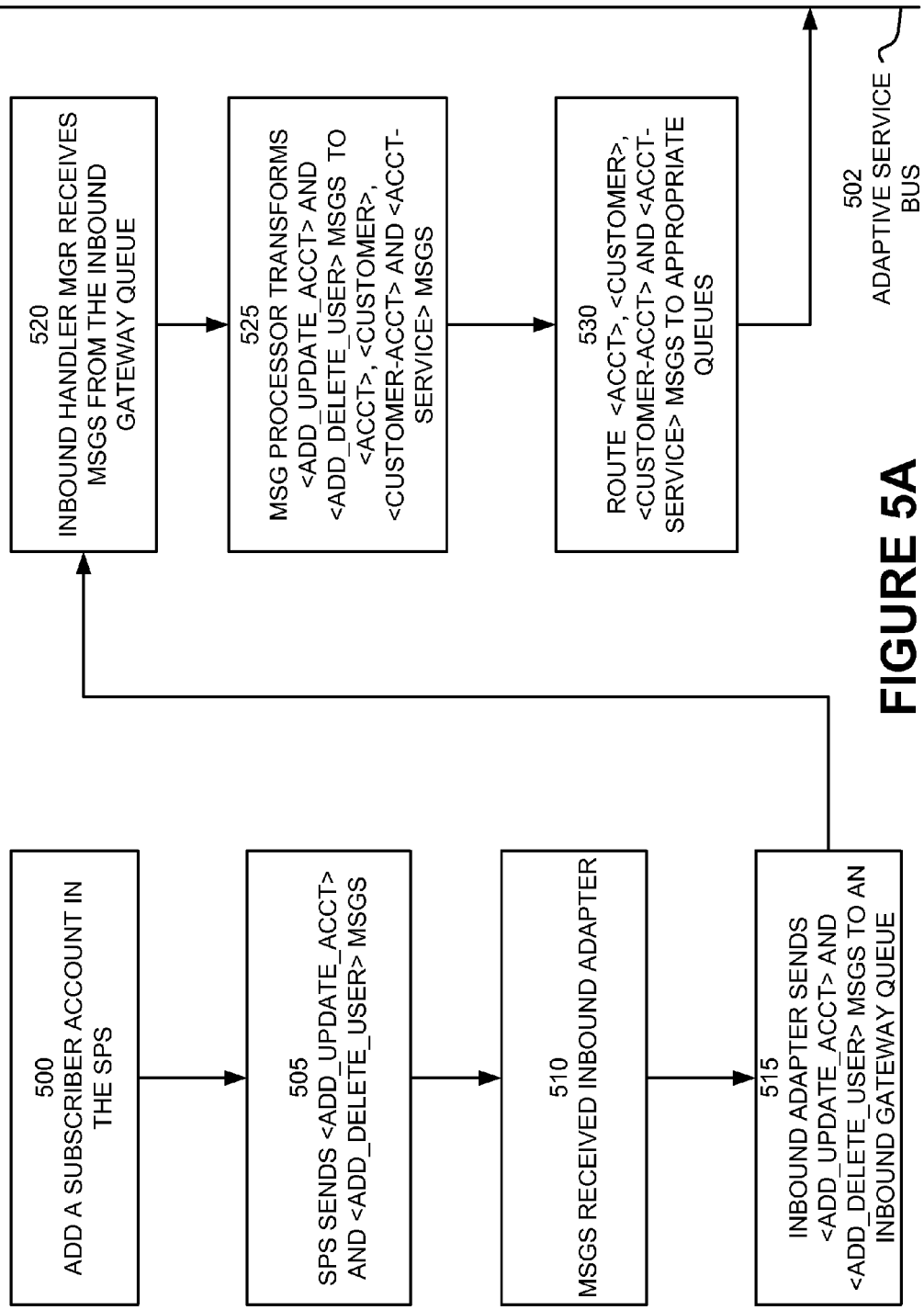
FIGS. 5A and 5B illustrate an embodiment in which an event comprises adding a subscriber account to a subscriber provisioning system (SPS).
Figure 5B:
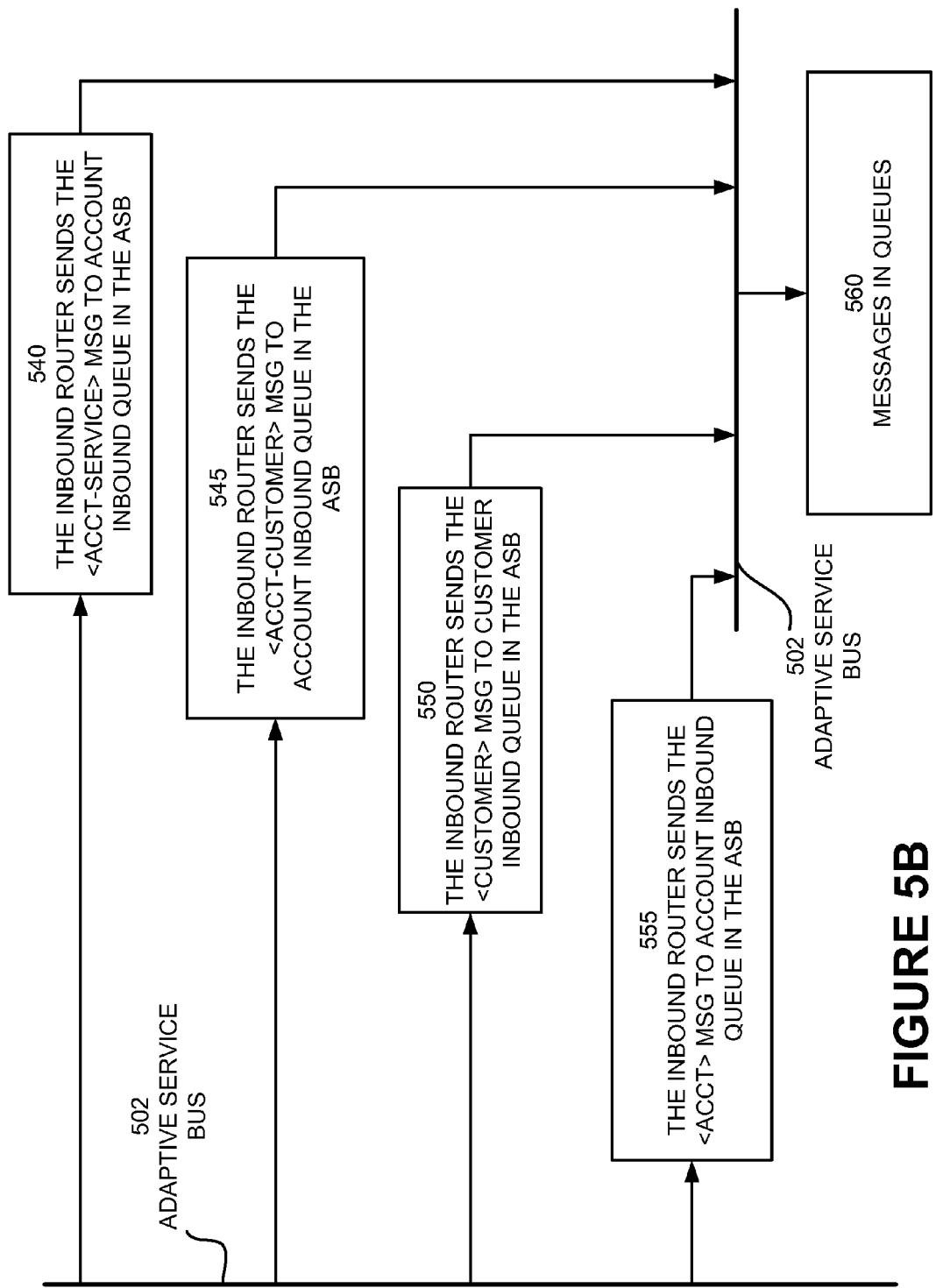

FIGS. 5A and 5B illustrate an embodiment in which an event comprises adding a subscriber account to a subscriber provisioning system (SPS). A subscriber account is added in the SPS 500. The SPS sends <ADD_UPDATE_ACCT> and <ADD_DELETE_USER> messages to an inbound adapter 510. The inbound adapter sends these messages to an inbound gateway queue 515.

An inbound handler manager (see FIG. 1) receives the <ADD_UPDATE_ACCT> and <ADD_DELETE_USER> messages from the inbound gateway queue 520. A message processor (see FIG. 2 and FIG. 4) transforms the <ADD_UP-DATE_ACCT> and <ADD_DELETE_USER> messages to <ACCT>, <CUSTOMER>, <CUSTOMER-ACCT> and <ACCT-SERVICE> messages 525. The message processor routes the <ACCT>, <CUSTOMER>, <CUSTOMER-ACCT> and <ACCT-SERVICE> messages 530 to the appropriate queues. Referring to FIG. 5B, an inbound router sends the <ACCT-SERVICE> message 540, the <ACCT-CUSTOMER> message 545 and the <ACCT> message 555 to an account inbound queue, and sends the <CUSTOMER> message to a customer inbound queue 550 via adaptive service bus 502. The messages reside in their respective queues for routing to a destination 560.

Referring again to FIG. 4, layer 2 inbound connector 414 receives the processed event communication 400 and passes it to layer 2 ASB component 416 where it is processed according to the configuration of layer 2 ASB component 416. The further processed event communication 400 is passed to layer 2 outbound connector 418 and is received by queue B 420. In this embodiment, the event information is passed to directory 440, which is updated according to a rule appropriate to directory 440.

While the embodiments described in relationship to FIGS. 4 and 5A and 5B utilize queues as the source of communications into and out of ASB 100 (see, FIG. 1), the invention is not so limited. The message transport mechanism of the source of the communication is irrelevant to ASB 100. Stated differently, all communications platforms look the same to ASB 100. Nor is it required that the source of a communication and the destination of the communication utilize the same message transport mechanism. Thus, the queues of FIG. 4 may be generically represented as a "communications platform."

In yet another embodiment, an adaptive service bus as illustrated in FIG. 1 is used to unify disparate datastructures for use by one or more applications. By way of illustration, an adaptive service bus may establish channels into disparate service provider databases that contain unrelated subscriber, service and device information, construct messages out of the information in those databases, and correlate that information into a unified, comprehensive, "360-degree" view of each subscriber. Such a correlated datastructure would enable advanced new services such as unified messaging, video settop box notifications, and cross-service functionality to be provided to subscribers.

FIG. 6 illustrates an embodiment in which an ASB is used to provide an adaptive security communications system according to an embodiment. Communications platforms 605, 610, and 615 access bus 621. Communications platforms 605, 610, and 615 may utilize any transport mechanism for communicating information via a network and each may utilize a different transport mechanism. In this embodiment, a communication may have a security attribute that determines the level of sensitivity of the information being communicated. By way of illustration and not as a limitation, the security attribute may be associated with the communication itself, with the communications platform, with the communication destination, with a message type, with an author of the communication, and with a recipient of the communication.

Inbound connectors 620, 624, and 628 receive communications from communications platforms 605, 610, and 615, respectively, according to the configuration of inbound connector 620, 624, and 628. A communication received by inbound connector 620, 624, or 628 is sent to ASB component 630 via an appropriate inbound channel (not illustrated). The communication is processed by ASB component 630 and delivered over an appropriate outbound channel (not illustrated) to one of outbound connectors 640, 644, or 648 for communication to any one of destinations 650, 655, and 660.

Referring again to FIGS. 1 and 2, ASB component 630 comprises a channel manager 110, a channel handler 115, a message handler 120, and a configuration manager 180. Channel manager 110 comprises message processor 205, message transformer 215, message router interface 220 and configuration manager 225. Message processor 205 uses a configuration determined by configuration manager 225 to operate on communication 160. In accordance with its configuration, message processor 205 may be directed to message transformer 215 to obtain transform instructions that allow it to transform communication 160 into communication 160A (not illustrated). The transform instructions of message transformer 215 are established by configuration manager 225 and may be changed in "real time" by a message or a file sent over control channel 185 (FIG. 1) to configuration manager 180 (FIG. 1). In an embodiment, message handler 120 determines the security attribute of the inbound communication and selects the appropriate message processor 205 to process the inbound communication. By way of illustration, the security attribute may cause message handler 120 to employ message transformer 215 to encrypt the content of the inbound message and to route the inbound communication to any one of destinations 650, 655, and 660. Because ASB component 630 is adaptive as described in detail above, the response of ASB component 630 to an inbound communication and to a particular security attribute may be changed in real time across an entire communication system from a single network management location (not illustrated).

Referring again to FIG. 1, the adaptive service bus 100 may be used to transport communications in any enterprise. The content and purpose of the communication does not change the underlying architecture as previously described. Thus, an adaptive service bus 100 may be used to transport subscriber data in a cable environment and medical data in a medical environment. An adaptive service bus 100 may be used in a commercial environment, a government environment, an education environment, a research environment, and a military environment to name but a few.

Figure 7:
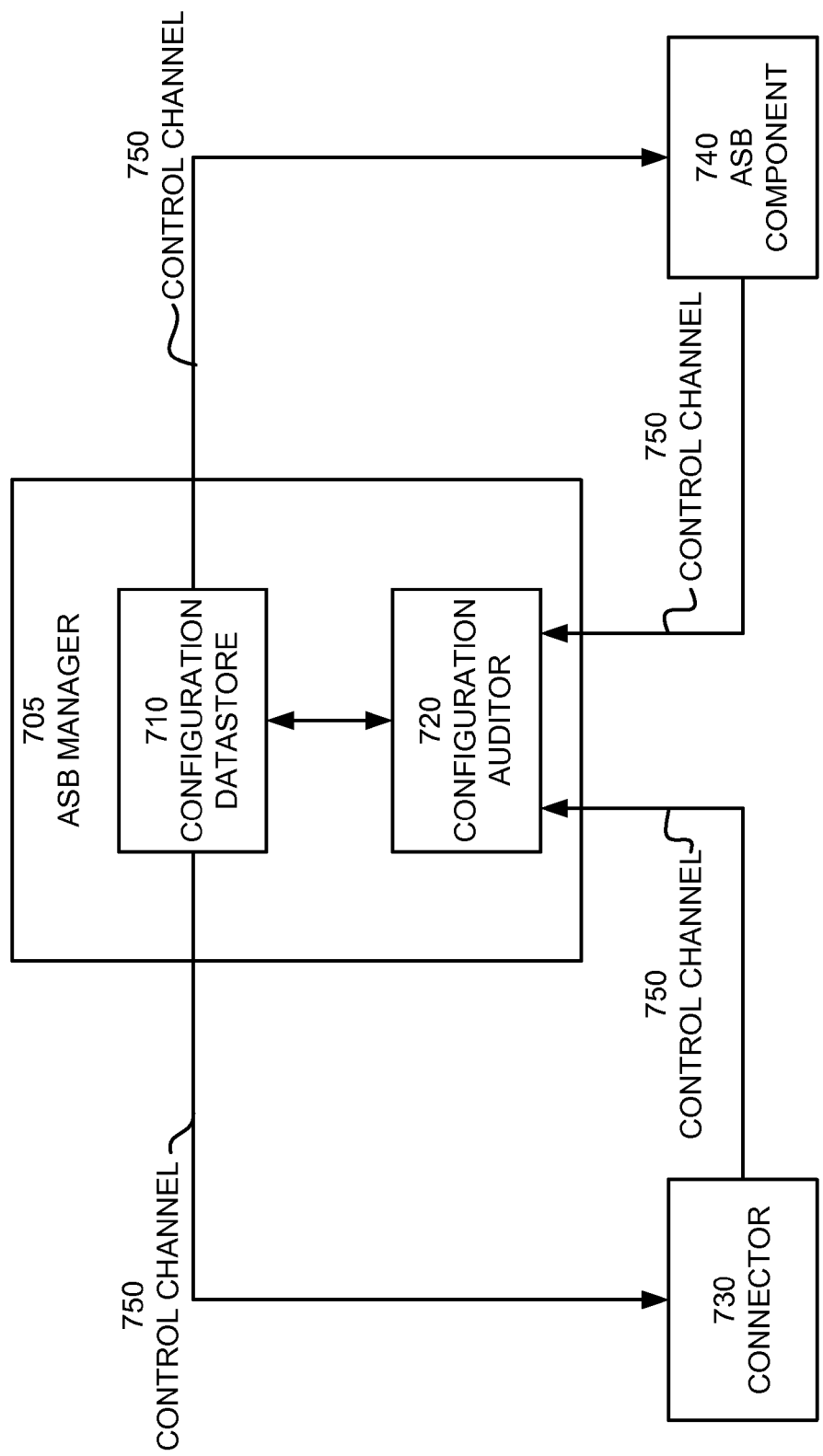
FIG. 7 illustrates a configuration management system according to an embodiment.

FIG. 7 illustrates a configuration management system according to an embodiment. ASB manager 705 manages the configuration of connector 730 and ASB component 740. Configuration datastore 710 provides configuration documents to connector 730 and ASB component 740 via control channel 750. In addition, configuration auditor 720 determines a present configuration of connector 730 and ASB component 740 and determines whether the configuration matches the configuration established in configuration datastore 710. This audit function may be performed by any reporting mechanism. By way of illustration and not as a limitation, configuration auditor 720 may poll connector 730 and ASB component 740 for their configurations via control channel 750. Alternatively, and not as a limitation, connector 730 and ASB component 740 may periodically report their configurations to configuration auditor 720 via control channel 750. Any discrepancies identified by configuration auditor 720 may result in an alert or an alarm being issued to the ABS manager 705.

An adaptive service bus has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for communicating over an adaptive service bus comprising:
    detecting at an inbound connector receipt of an event communication generated in response to an event, wherein the event comprises a change in information maintained by an enterprise;
    selecting an inbound channel and a channel manager appropriate to the event communication as determined by a configuration of the inbound connector;
    receiving by the channel manager the event communication via the inbound channel;
    selecting by the channel manager a channel handler appropriate to the event communication as determined by a configuration of the channel manager;
    selecting by the channel handler a message handler appropriate to the event communication to process the event communication as determined by a configuration of the channel handler;
    determining by the message handler a destination address of the event communication in accordance with a configuration of a router;
    selecting by the message manager an outbound channel for the event communication; and
    sending via the outbound channel the event communication to the destination address.

2. The method of claim 1 wherein the outbound channel is selected based on at least one of the event communication source, the event communication destination address, and the event communication type.

3. The method of claim 1, wherein the event communication comprises a communication formed in accordance with a communication protocol.

4. The method of claim 3, wherein the communication protocol is selected from the group consisting of a protocol used for email transport, a protocol used for hypertext transfer, a protocol used for transport of data from a database, and a protocol used for transport of data between queues.

5. The method of claim 1, wherein the message manager further comprises a message processor and a transformer and the method further comprises:
    selecting by the message processor the transformer to operate on the communication, wherein the selection of the transformer is in accordance with a configuration of the message processor; and
    translating by the transformer the event communication in accordance with a configuration of the transformer to a format suitable for processing by the message processor.

6. The method of claim 1 further comprising:
    prior to sending via the outbound channel the event communication to the destination address:
        identifying a current format of the event communication;
        identifying a format suitable for delivery to the destination; and
        translating the event communication to the delivery format.

7. The method of claim 1, wherein sending via the outbound channel the event communication to the destination address comprises:
    configuring an outbound connector to receive the event communication via the outbound channel; and
    passing the event communication to a receiving communications platform at the destination address.

8. The method of claim 1 wherein determining by the message handler a destination of the event communication in accordance with a configuration of a router comprises:
    determining two or more destinations for the event communication;
    selecting by the message manager one or more outbound channels appropriate for each of the two or more destinations; and
    sending via the one or more outbound channels the event communication to the two or more destinations.

9. The method of claim 1, wherein the enterprise is selected from the group consisting of a medical enterprise, a commercial enterprise, a government enterprise and a military enterprise.

10. The method of claim 1, wherein the enterprise is a multi-channel video programming distributor.

11. The method of claim 1, wherein the information maintained by the server is selected from subscriber records, patient records, financial records, employment records, military service records, and government records.

12. An adaptive service bus comprising:
    an inbound connector in communication with an inbound channel;
    the inbound channel in communication with a channel manager;
    the channel manager in communication with a channel handler;
    the channel handler in communication with a message handler;
    the channel handler in communication with a router;
    the message handler in communication with an outbound channel; and
    a configuration manager connected to the bus, wherein the configuration manager is configured for communicating a control message that when received by the adaptive service bus configures the adaptive service bus to perform operations comprising:
        detecting by the inbound connector receipt of an event communication generated in response to an event, wherein the event comprises a change in information maintained by an enterprise;
        selecting an inbound channel and a channel manager appropriate to the event communication as determined by a configuration of the inbound connector;
        receiving by the channel manager the event communication via the inbound channel;
        selecting by the channel manager a channel handler appropriate to the event communication as determined by a configuration of the channel manager;
        selecting by the channel handler a message handler appropriate to the event communication to process the event communication as determined by a configuration of the channel handler;

determining by the message handler a destination address of the event communication in accordance with a configuration of the router;

selecting by the message manager an outbound channel for the event communication; and sending via the outbound channel the event communication to the destination address.

13. The adaptive service bus of claim 12, wherein the outbound channel is selected based on at least one of the event communication source, the event communication destination address, and the event communication type.

14. The adaptive service bus of claim 12, wherein the event communication comprises a communication formed in accordance with a communication protocol.

15. The adaptive service bus of claim 14, wherein the communication protocol is selected from the group consisting of a protocol used for email transport, a protocol used for hypertext transfer, a protocol used for transport of data from a database, and a protocol used for transport of data between queues.

16. The adaptive service bus of claim 12, wherein the message manager further comprises a message processor and a transformer and wherein the control message further causes the adaptive service bus to perform operations comprising:

selecting by the message processor the transformer to operate on the communication, wherein the selection of the transformer is in accordance with a configuration of the message processor; and translating by the transformer the event communication in accordance with a configuration of the transformer to a format suitable for processing by the message processor.

17. The adaptive service bus of claim 12, wherein the control message further causes the adaptive service bus to perform operations comprising prior to sending via the outbound channel the event communication to the destination address:

identifying a current format of the processed communication;

identifying a format suitable for delivery to the destination address; and translating the event communication to the delivery format.

18. The adaptive service bus of claim 12 further comprising an outbound connector and wherein the control message further causes the adaptive service bus to perform operations comprising:

receiving the event communication via the outbound channel; and passing the event communication to a receiving communications platform at the destination address.

19. The adaptive service bus of claim 12, wherein the control message further causes the adaptive service bus to perform operations comprising:

determining two or more destinations for the event communication;

selecting by the message manager one or more outbound channels appropriate for each of the two or more destinations; and sending via the one or more outbound channels the event communication to the two or more destinations.

20. The adaptive service bus of claim 12, wherein the enterprise is selected from the group consisting of a medical enterprise, a commercial enterprise, a government enterprise and a military enterprise.

21. The adaptive service bus of claim 12, wherein the enterprise is a multi-channel video programming distributor.

22. The adaptive service bus of claim 12, wherein the information maintained by the server is selected from subscriber records, patient records, financial records, employment records, military service records, and government records.

23. The adaptive service bus of claim 12, wherein the inbound connector comprises a wrapper around the mechanics of a standard communications protocol operated by a communications platform.

* * * * *